United States Patent [19]
Tehrani

[11] Patent Number: 5,352,070
[45] Date of Patent: Oct. 4, 1994

[54] SUPPLEMENTAL APPARATUS FOR A HAND-HELD POWER DRILL

[76] Inventor: Henry Tehrani, 3652 Veteran Ave., Los Angeles, Calif. 90034

[21] Appl. No.: 949,904

[22] Filed: Sep. 23, 1992

[51] Int. Cl.$^5$ .............................................. B23B 47/18
[52] U.S. Cl. ..................... 408/102; 408/111; 408/138
[58] Field of Search ............... 408/102, 111, 129, 137, 408/138, 712, 99, 124

[56] References Cited

U.S. PATENT DOCUMENTS

| | | | |
|---|---|---|---|
| 1,434,946 | 11/1922 | Fiorillo | 408/111 |
| 2,617,455 | 11/1952 | Kuta | 408/712 |
| 3,679,320 | 7/1972 | Bohorquez et al. | 408/111 |
| 3,884,280 | 5/1975 | Chailer | 408/22 |
| 4,890,962 | 1/1990 | Nydegger | 408/138 |

Primary Examiner—Daniel W. Howell
Attorney, Agent, or Firm—Ashen & Lippman

[57] ABSTRACT

Supplemental apparatus for a hand-held power drill that uses the rotational movement of the drill for both rotating a drill bit and advancing the drill bit into the work piece. In one form the illustrated apparatus comprises a separate attachment that includes a base for releasibly attaching to a hand drill. The base supports a moveable support unit for releasibly holding a selected drill bit in a position to be advanced into the work piece to drill a desired hole. A transmission mechanism on the base is connected to the support unit and transmits rotation from the chuck of the drill so as to both (1) rotate the drill bit, and (2) move the drill bit forwardly relative to the base into the work piece. The power drill connects to the attachment from the side so that it is disposed generally at right angles to the drill bit. This arrangement is very compact and allows the drill to be used in a limited spaces where it is very difficult for the operator to otherwise apply, from the side, the required forward force on the drill. The attachment may also include a control such as a clutch that is manually operable by the operator to selectively vary how rapidly the drill bit advances into the work piece. In another form the apparatus and the drill may be combined in one integrated unit.

13 Claims, 3 Drawing Sheets

SUPPLEMENTAL APPARATUS FOR A HAND-HELD POWER DRILL

FIELD OF THE INVENTION

This invention relates to supplemental apparatus for a hand-held power drill, and more particularly, to such an apparatus that uses the rotation produced by the drill to automatically advance a drill bit into the work piece while also rotating the drill bit. This is done without a separate power source or the operator having to apply manual force to advance the drill bit into the work piece. The apparatus may be a separate attachment or integrated with the drill into a single unit.

BACKGROUND OF THE INVENTION

Hand-held power drills are widely used tools. When using such a drill, the operator is normally required to apply a substantial manual forward force to advance the drill bit into the work piece. This obviously requires effort from the operator and uses energy that could be utilized in other ways. Further, after a substantial amount of this type of drilling, the operator can become fatigued and subject to slow down and/or injury.

Of particular significance, it has been found that often drilling must take place where there is a restricted space in front of the hole to be drilled. The operator must hold the drill from the side. This makes it difficult for the operator to apply the necessary forward force on the drill bit. It is also difficult to keep the drill bit aligned at right angles to the work piece surface. Further, especially when large size drills are required it is difficult to hold up the weight of the drill from the side.

It is also often desirable for the operator to be able to control the rate of advancement of the drill bit into the work piece.

There have been various attempts to meet these needs, but they have all been lacking in various ways.

For example, U.S. Pat. No. 3,060,769 uses a complicated spring-loaded guide for advancing the drill bit. The spring is tensioned and it then applies an advancing force on the drill. This is not very satisfactory. The advancing force that the spring is capable of applying is rather limited. However, as stronger springs are used, the weight of the device undesirably increases. Further the force of each spring is a generally fixed value which cannot be varied during operation. This device also does not readily allow one to operate in tight spots.

Another attempt is disclosed in U.S. Pat. No. 3,089,357 that uses a guiding and advancing system that is very hard to attach to the drill and very difficult to use.

SUMMARY OF THE DISCLOSURE

The present invention provides improved, simple, inexpensive supplemental apparatus for use with a hand-held power drill. Broadly, the apparatus utilizes the rotational force produced by the drill to not only rotate a drill bit, but to simultaneously advance the drill bit against and into the work piece to drill the desired hole. This is achieved without the operator having to apply such an advancing force, either directly on the drill or by some other indirect mechanism, to advance the drill bit. Neither is there a requirement for a separate source of power to advance the drill bit into the work piece. The drill with this apparatus can operate in a limited space since the operator can hold the drill and apparatus from the side and need not get behind the drill bit to push it forwardly into the work piece. The apparatus also maintains the drill bit at right angles to the work piece surface during the drilling operation, normally a difficult task when holding the drill and apparatus from the side.

In one form, the apparatus is a separate attachment. The illustrated attachment includes a base that is detachably connected to the hand-holdable power drill. Movably on the base is a holding or support unit that can hold a drill bit in a position aligned with the hole to be drilled and can move forwardly relative to the base and toward the work piece.

Connected to the holding unit and the power drill is a transmission means or mechanism that transmits the rotation of the chuck of the drill to the holding means so as to cause both (1) rotation of the drill bit, and (2) forward advancing movement relative to the base of the holding means and the drill bit toward the work piece. The rotation of the drill bit and the advancing of the drill bit are generally concurrent or simultaneous, although the drill bit is rotated at a high speed whereas the advancing movement is reduced or geared down to a relatively slow advancing speed.

The attachment may include a control means such as a clutch for manual use by the operator to control the rate of advancing movement of the holding means and the drill bit.

In another form, the supplemental apparatus may be combined with a hand-held power drill into a single integrated unit or package.

IN THE DRAWINGS

DETAILED DESCRIPTION OF THE DRAWINGS

Figure 1:
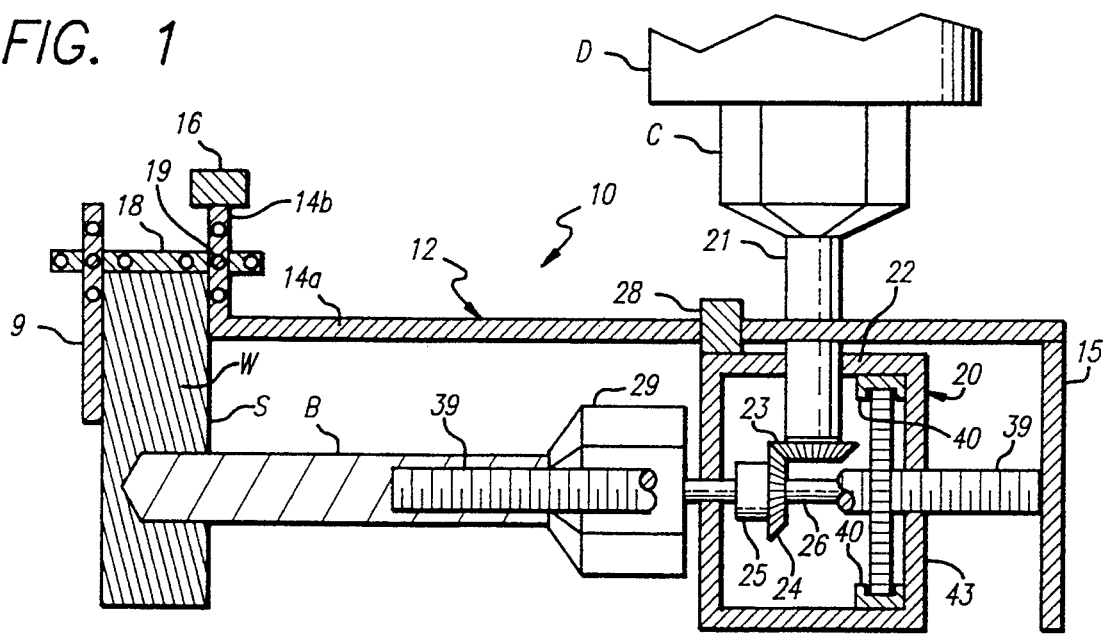
FIG. 1 is a schematic side cross-sectional view of a presently preferred attachment in accordance with the invention.
Figure 2:
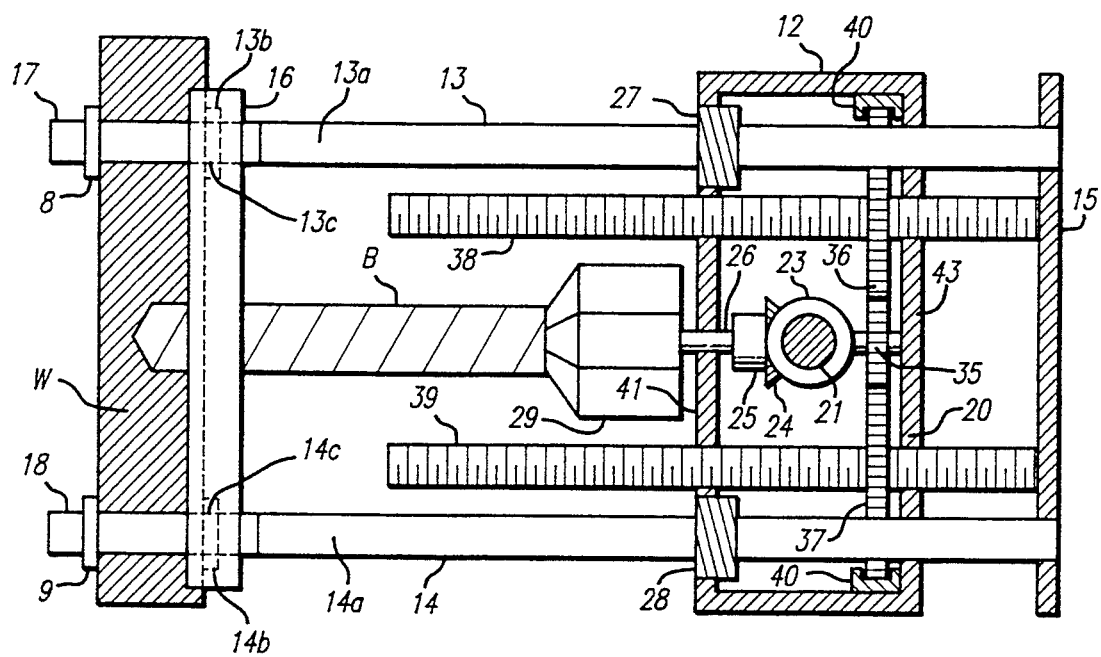
FIG. 2 is a schematic top plan cross-sectional view of the embodiment of FIG. 1.

Referring to FIGS. 1 and 2, a standard hand-holdable power drill is designated D. The drill D has a standard rotatable chuck C which can be manually opened and closed to releasibly grasp the end of a drill bit or other similarly shaped part.

The illustrated separate attachment 10 includes a base 12 which may be releasibly supported on a work piece W in which a hole is to be drilled. The illustrated base 12 includes a pair of transversely space-apart side members 13 and 14. Each side member 13, 14 includes an elongated main portion 13a, 14b which extends generally at right angles to the surface S of the work piece W when the base is mounted on the work piece. Each side member 13, 14 also has an upright forward portion 13b, 14b that is connected to and extends upwardly from the forward end of the associated main portion 13a, 14a. A transversely extending front cross piece 16 is connected across the upper ends of the upright portions 13b, 14b. The crosspiece 16 may be grasped and used as a handle. A rear crosspiece 15 in the form of a plate member is connected to the rear ends of the main portions 13a, 14a and extends generally parallel to the work piece surface S. The plate member 16 is spaced away from that surface by the length of the main portions 13a, 14a. Horizontally front-to-rear extending spaced-apart connector sections 17 and 18 releasibly and adjustably connect to the side members 13, 14. More particularly, each upright portion 13b, 14b has an upright vertical central slot 13c, 14c through which a connector section 17, 18 extends. There is a series of transversely extending vertically spaced holes through the upright portions 13b, 14b. There is also a series of transversely extending horizontally spaced holes through the connector sections 17, 18. A selected hole through an upright portion 13b, 14b may be aligned with a selected hole through the rearward end of an associated connector section 17, 18 and a pin 19 may be releasibly inserted to maintain the desired relationship between the upright portion and the rearward end of connector section. The forward ends of the connector sections 17, 18 may be similarly releasibly connected to upright members 8, 9. Members 8, 9 have similar upright vertical central slots and transversely extending vertically spaced holes.

Thus, the side members 13, 14, the connector sections 17, 18 and the upright members 8, 9 may be selectively and releasibly connected to one another as shown in FIGS. 1 and 2. This assembled forward portion of the base 12 can be mounted on the top edge of the work piece as shown in those drawings to support the forward end of the attachment on the work piece. The base 12 may be adjusted for thicker or thinner work pieces, and also for locating the drill bit B different desired distances from the top edge of the work piece.

This illustrated adjustable base 12 is simple, economical, and reliable. Other forms of adjustable support or base structure may be provided if desired.

The base may be made of any suitable material or combination of materials that are sufficiently strong and durable to withstand the forces involved. Various metals and alloys may be utilized for this purpose.

A generally rectangular gearbox 20 is mounted on the base 12. The box 20 includes a pair of extensions 27 and 28 which serve to mount the box on the frame members 13 and 14 for movement along the members toward and away from the work piece W. An elongated shaft 21 extends upwardly through a wall 22 of the box 20 for free rotation. The axis of the shaft 21 is generally parallel to the surface S of the work piece. The inner end of the shaft 21, which is disposed within the box 20, carries a bevel gear 23. This gear 23 meshes with a second bevel gear 24 having generally the same size and number of teeth. Gears 23, 24 form a set of miter gears which turn the rotation of the drill 90 degrees. The gear 24 has a hub 25 that is fixed to a rotary shaft 26 that is mounted in the box for rotation (see FIG. 2). The axis of the shaft 26 is generally perpendicular to the surface S of the work piece.

Mounted on the end of the shaft 26 that extends beyond the box 20 forwardly in the direction of the work piece is an openable and closeable chuck 29 is mounted for rotation with the shaft 26. The chuck 29 may be manually opened to releasibly receive the end of selected drill bit B and to grip and hold the drill bit in this manner for common rotation. The drill bit extends generally at right angles to the surface S of the work piece.

The outer end of the shaft 21 may be releasibly gripped by the chuck C of the hand-holdable power drill D as shown in FIG. 1 for imparting rotation to the shaft.

Thus, rotation of the chuck C of the hand-holdable drill D rotates the shaft 21 and its gear 23. This in turn, rotates gear 24, hub 25, shaft 26, chuck 29 and drill bit B. Thus, the rotational power of the drill D is turned 90 degrees and causes rotation of the drill bit B.

The rotational power of the drill D is also used to advance the drill B into the work piece W. As shown in FIG. 2, the shaft 26 also rotates a small gear 35 fixed to the shaft 26. Small gear 35 meshes with and drives a pair of large gears 36 and 37 disposed within the box 20. The large gears 36 and 37 are mounted respectively on a pair of elongated spaced-apart screws 38 and 39. The screws 38, 39 extend through mating threaded center holes in the gears 36, 37 so that relative rotation between the gears and the screws produces coaxial relative movement between them. Abutments 40 are fixed to the inside walls of the box and extend inwardly to positions on either sides (front and rear) of edge portions of the large gears 36, 37. As the gears 36, 37 move axially of the screws 38, 39, the gears engage the abutments 40 to thereby effect movement of the box 20 toward and away from the work piece. The rear ends of the screws 38 and 39 are fixedly secured to the rear plate 15 of the frame 12. The screws 38 and 39 extend generally parallel to the drill bit B and generally perpendicular to the surface S of the work piece. The screws 38, 39 extend through suitable bearings on the front and rear walls 41, 43 of the box 20 to support the box and help guide its movement toward and away from the work piece.

Forward rotation of the drill chuck C causes movement of the gearbox 20 toward the work piece, while reverse rotation of the chuck C causes movement of the gearbox away from the work piece. The movement of the gearbox 20 toward the work piece causes the forward movement of the drill bit B against and into the work piece as shown in the drawings.

The gear box 20 with the drill bit B rides along the base straps 13, 14 and the screws 38, 39, which keeps the drill bit advancing at right angles to the work piece surface. This may be otherwise difficult to maintain, especially when holding a drill from the side.

After the desired depth of hole has been drilled, the motor of the drill D may be reversed, which causes the drill bit B to rotate in the reverse direction and the gearbox 20 and other elements connected to it to move rearwardly away from the work piece.

It will be further noted that the drill D is mounted to the top of the attachment 10 so that the maximum space required in front of the face S of the work piece is determined by the length of the base 12 and in particular, the straps 13 and 14.

The illustrated bevelled gears 23 and 24 are of the same size, and thus, the speed of rotation of the chuck C of the drill is the same speed of rotation imparted to the drill bit B. This may be varied if desired. Because the gear 35 is much smaller than the gears 36 and 37 however, the rotation of the gears 36, 37 is much slower than the rotation of the drill chuck C. Further, the rotation of the gears 36, 37 is then translated into an advancing movement of the box 20 and drill bit. The proportioning of the gears 35, 36 and 37 and the angle of the helical thread on the screws 38, 39 may be used to determine just how fast the drill bit B is advanced into the work piece relative to the speed of rotation of the drill bit.

Since the advancing power is applied generally evenly on either side of the drill, the torquing forces on the gear box and thus on the drill tend to balance out, so the operator does not have to counteract any significant rotational forces.

Figure 3:
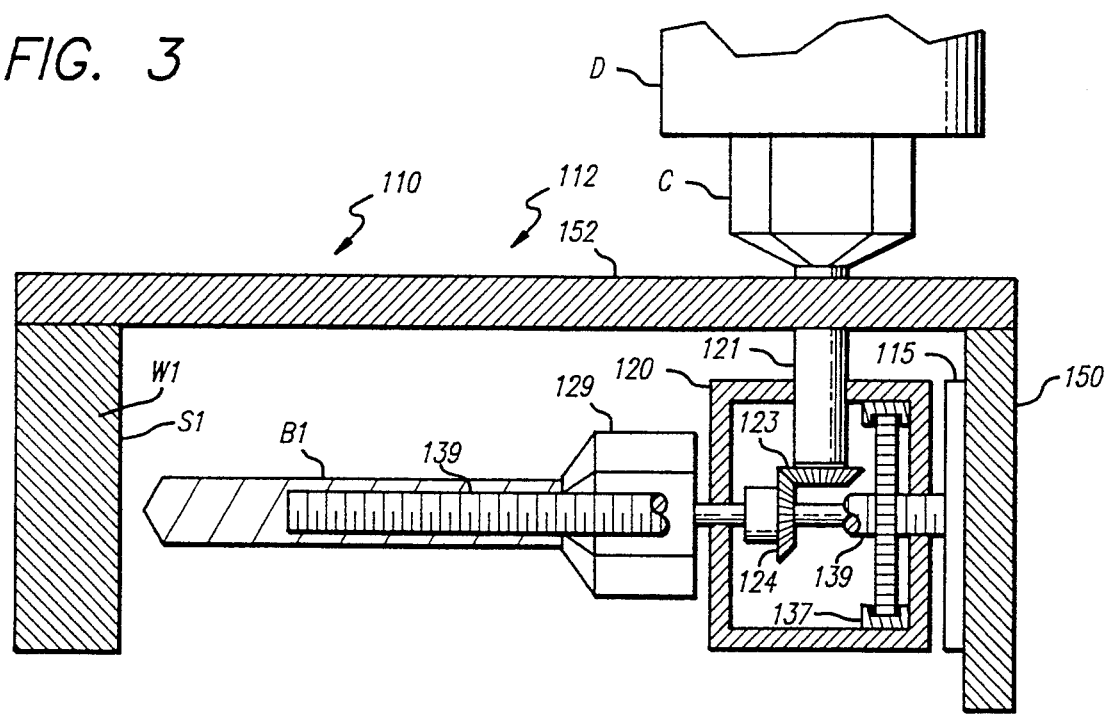
FIG. 3 is a schematic side cross-sectional view of a modification of the drill attachment of FIGS. 1 and 2.

FIG. 3 shows a modified attachment 110 from that shown in FIGS. 1 and 2. Instead of the base 12 which supports the gearbox 20 and which provides a stationary rear wall 15, the rear support is provided by a rear part or wall member 150 of the structure that is attached to the work piece W1. The work piece W1 is connected to a rearwardly extending wall member 152 which in turn is connected to the rear wall member 150. Wall member 150 extends generally parallel to the surface S1 of the W1 work piece but spaced apart from the work piece surface S. This rear wall 150 provides the rear support against which a rear plate 115 abuts. The rear plate 115 is fixedly supports the rear ends of the screws 138, 139. The gear box 120 is supported on the screws 138, 139 for movement along the screws as the large gears 136, 137 rotate relative to the screws 138, 139. Thus, rotation of the shaft 121 driven by the drill D, rotation of gears 123, 124, shaft 126, small gear 135, and large gears 136, 137 cause the gear box movement. Rotation of the shaft 126 also rotates the chuck 129 and the drill bit B1.

This embodiment eliminates the need for a base that attaches to the work piece, however, it does require the existence of a suitable rear support such as member 150.

Figure 4:
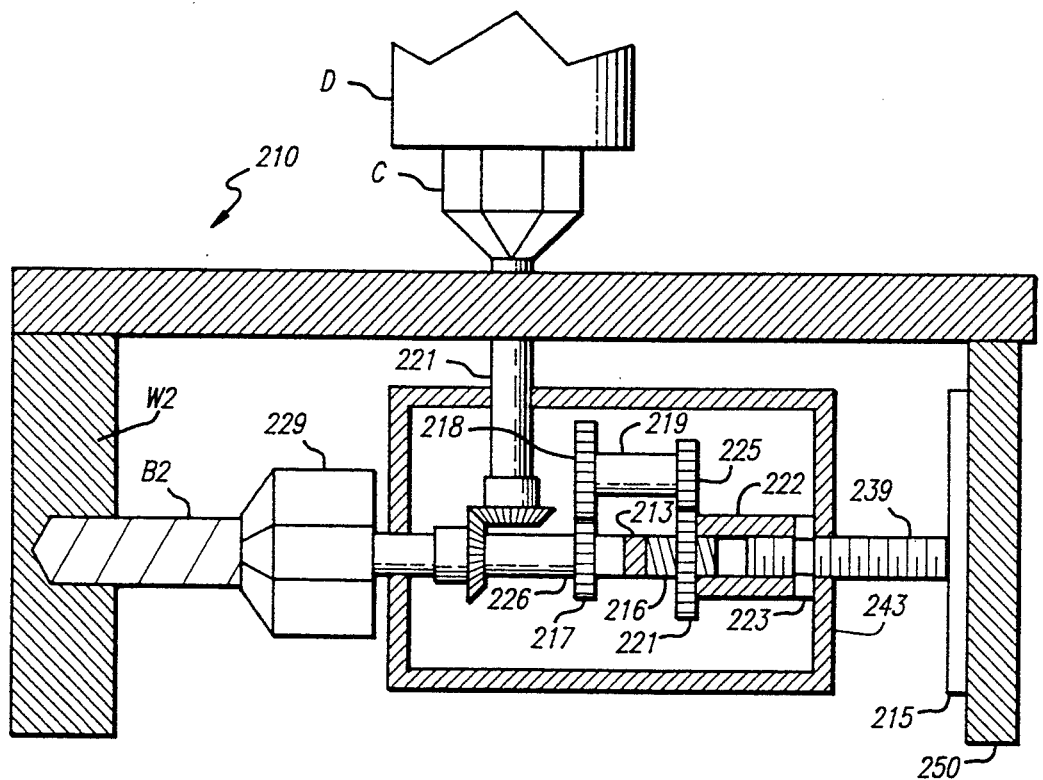
FIG. 4 is a schematic side cross-sectional view of another modification of the drill attachment of FIGS. 1 and 2.

FIG. 4 shows a still further modified attachment 210. This attachment 210, again, assumes the existence of a rear support member designated in this drawing 250. The portion of the attachment 210 that rotates the drill bit B2 is generally like that shown in FIGS. 1–3. The mechanism for advancing the drill bit B3 into the work piece W2 is modified, however. In general, rotation at lower speed and higher torque is transmitted to a hollow shaft 222 and a threaded nut 223. The nut 223 meshes with a single elongated screw 239 to provide the linear forward advancing movement of the gear box 220 and the drill bit B2.

More particularly, the shaft 226, that is connected to and drives the chuck 229, is connected to a small gear 217 that drives a larger gear 218. The gear 218 is fixed to a shaft 219 (suitably mounted for rotation in the gearbox 220 by means not shown in the drawings) on which another small gear 225 is mounted for common rotation. Smaller gear 225 in turn drives a larger gear 221 that fixedly mounted on a shaft 216. The forward end of shaft 216 is aligned with and connected by a bearing 213 to the rear end of the shaft 226. The bearing 213 supports the shafts 215 and 226 and allows them to rotate at independent and different speeds. The hollow shaft or sleeve 222 is fixed to the rear end of shaft 216 for common rotation. Sleeve 222 extends rearwardly in the gearbox 220. At its rearward end, the hollow sleeve 222 is connected for common rotation with the collar or nut 223 that has a central threaded hole. The nut 223 is rotatable supported by the rear wall 243 of the box 220. The elongated screw 239 extends through the rear wall of the gearbox 220 and through the rotatable collar 223 and the hollow sleeve 222. The spiral grooves of the screw 239 mesh with the threads of the nut 223 so that rotation of the nut 223 moves the nut forwardly and rearwardly along the screw 239. Thus, rotation of the shaft 221, which is transmitted to the shaft 226 eventually causes rotation of the nut 223 and thereby movement of the gearbox 220 forwardly and rearwardly.

The rear end of the screw 239 is abutted against and fixedly secured to a transverse rear plate 215. The plate 215 abuts the transversely extending rear support member 250. In this case, since the advancing force is aligned with the axis of the drill bit, there is essentially no rotational force or torque applied to the gear box or the operator.

Figure 5:
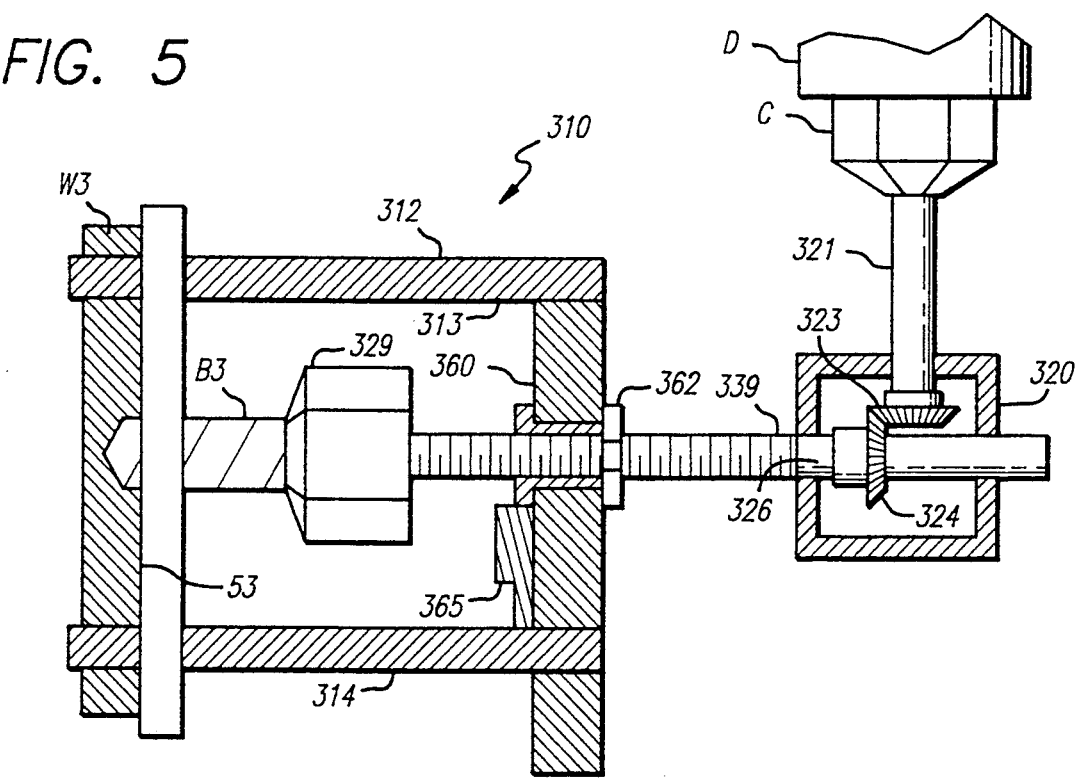
FIG. 5 is a schematic side cross-sectional view of a further modification of the drill attachment of FIGS. 1 and 2.

FIG. 5 shows still another modified attachment 310. A suitable base or bracket 312 is detachably mounted on the work piece W3. This base 312 supports a single elongated screw 339 that extends at generally right angles to the front surface S3 of the work piece W3. In this form of attachment, the screw 339 is rotatable. At its front end, the screw 339 supports the chuck 329 for common rotation. The chuck 329 releasibly holds the drill bit B3. The rear end of the screw 339 is connected to an output shaft 326 of a gearbox 320. The gearbox 320 includes a rotatable upright shaft 321 that is connected to and driven by the chuck C of the drill D. At its inner end within the gearbox, the shaft 321 carries a first bevel gear 323 which meshes with a second bevel gear 324. The gear 324 is mounted for common rotation on the output shaft 326 that is rotatable mounted within the gearbox 320. This rotation imparted to shaft 321 is transmitted to the screw 339.

The base 312 includes a transverse wall 360 in which a threaded nut or sleeve 362 is mounted for free rotation. The screw 339 extends through and messes with the threads of the nut 362. Since the nut 362 can normally rotate freely relative to the transverse base member 360, the nut will normally rotate along with the screw 339 by virtue of friction between the screw and the nut. Since the advancing force is along the same axis as the drilling axis, there is essentially no rotational force or torque on the gear box or the operator.

A moveable control member 365 is mounted on the transverse base member 360 for selected movement toward and away from the nut 362 (by suitable means not shown in the drawings). When moved into engagement with the nut 362, the resulting friction between the control member 365 and the nut 362 tends to restrict the free rotation of the nut 362 and thus, produces relative rotational movement between the nut and screw 339. This relative rotation in turn causes axial movement of the screw 339 relative to the nut 362 to advance or withdraw the drill bit B3 from the work piece. The amount of pressure exerted by the control member 365 controls the amount of relative movement between the nut 362 and the screw 339 and thus the speed of advancing or withdrawing of the drill bit. While other means for controlling the speed of advancing the drill bit may be provided for manual operation by the operator, the illustrated structure provides a very simple, economical, yet effective construction for achieving this purpose.

Figure 6:
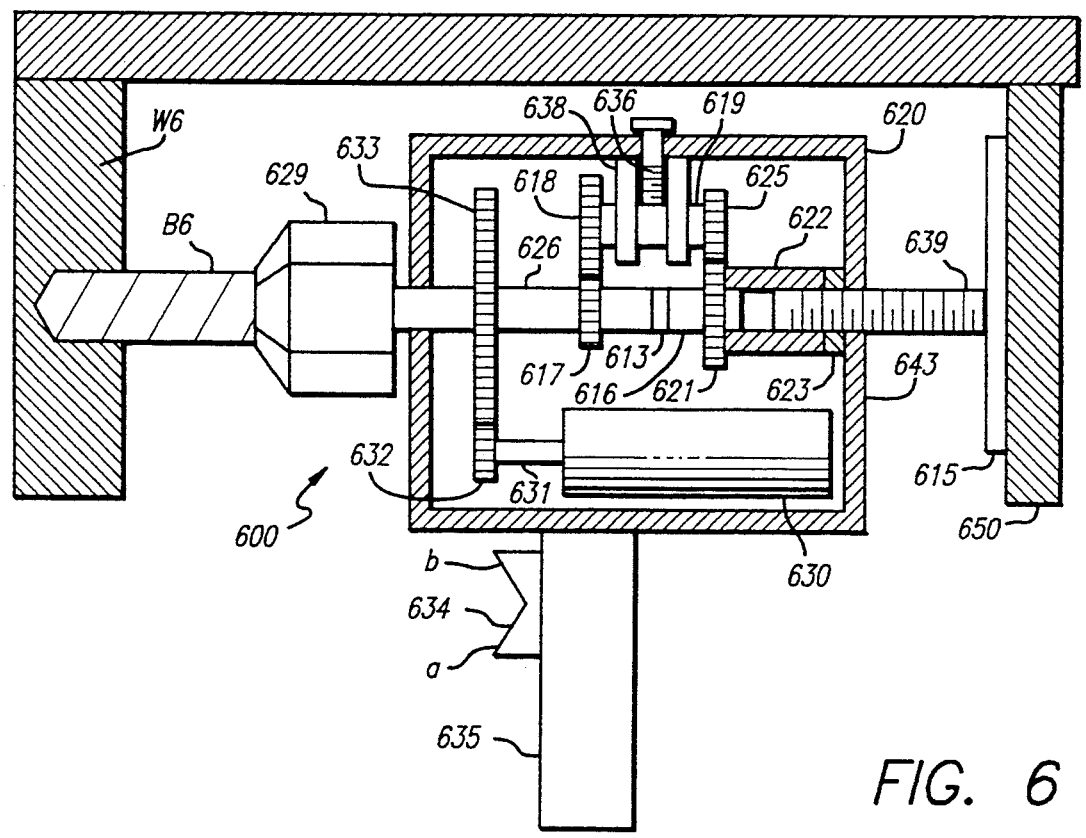
FIG. 6 is a schematic side cross sectional view of a drill that incorporates the supplemental apparatus of the present invention into a single integrated unit.

FIG. 6 illustrates the supplemental apparatus combined in a single unit with a hand-held drill. More particularly, the unit 600 includes a base or housing 620 in the form of a generally rectangular box. There is a depending handle 635 on which is mounted a standard moveable on/off finger switch 634 having portions a and b to be pressed to respectively turn the motor 630 on and off. The motor 630 is mounted within the housing 620 and has rotatable output shaft 631. A small gear 632 is mounted on the outer end of the output shaft 631.

The small gear 632 meshes with a substantially larger gear 633 which is fixedly mounted on a main drive shaft 626 that extends front-to-rear of the housing 620. The shaft 626 extends through and is rotatably supported as by a suitable bearing in the front wall of the housing 620. Mounted on the forward end of the shaft 626 forwardly of the housing 620 is a chuck 629 for releasably holding a drill bit B6. Thus, rotation of the motor output shaft 631 transmits rotation, through gears 632 and 633 and shaft 626, to chuck 629 and drill bit B6. The unit may be aligned relative to the work piece W6 so that forward movement of the rotating drill bit B6 serves to drill the desired hole in the work piece.

The means or mechanism for automatically advancing the drill bit B6 into the work piece incident to rotation of the motor shaft 631 is provided by this form of the device.

More particularly, the unit includes a rear plate 615 which extends transversely and is used to abut against a structural member 650 which is connected to the work piece W6. Extending forwardly from the plate 615 and fixedly secured to that plate is an elongated rod 639 which has spiral or helical threads along its length. The forward end of the rod 639 extends through the rear wall of the housing 620 and forwardly within the housing. The forward end of the rod 639 extends into a hollow shaft 622 which has a threaded collar 623 at its rearward end. The collar 623 is rotatably mounted on the inside of the rear wall of the housing 620. The threaded collar 623 meshes with the helical threads of the rod 639 so that rotation of the hollow shaft 622 and the threaded collar 623 relative to the rod 639 effects relative linear movement between the rod 639 and the housing 620 along the axis of the rod. The forward end of the hollow shaft 622 is fixed for common rotation to a short shaft 616 that is in turn connected at its forward end, through a freely rotating bearing 613 to the rearward end of the main shaft 626. The shaft 626 can rotate freely and separately from any rotation of the shaft 616 or hollow shaft 622 or collar 623. Thus, without more, rotation of the main shaft 626 under the influence of the motor would not produce rotation of the hollow shaft 622 or the threaded collar 623 and thus, would not produce forward movement of the housing 620 or the drill bit B6 relative to the work piece.

Means or mechanism is provided for selectively connecting the main drive shaft 626 to the hollow shaft 622 and the threaded collar 623. More particularly, a shaft 619 is supported within the housing 620 spaced from and generally parallel to the main shaft 626 and the hollow shaft 622. The shaft 619 may be mounted on suitable supports 638 extending from the side wall of the housing. Gears are mounted on the shafts 626, 619 and 616/622 to transmit rotation while slowing the speed of rotation being transmitted. In this connection, there is a small gear 617 fixedly mounted on main shaft 626. The small gear 617 meshes with a larger gear 618 which is fixedly mounted on the front end of shaft 619. At the rear end of shaft 619, there is a small gear 625 fixedly mounted. Gear 625 meshes with a large gear 621 fixedly mounted on shaft 616. As noted above, shaft 616, hollow shaft 622, and threaded collar 623 all rotate as a single unit. Thus, when gears 617, 618, 625 and 621 are meshing with each other, rotation is transmitted from main shaft 626 to hollow shaft 622 and threaded collar 623. As also noted above, this causes relative rotation between collar 623 and rod 639 to provide linear forward and rearward movement of the unit housing 620 and of the drill bit B6.

Means may be provided for selectively disengaging gears 618 and 625 from gears 617 and 621, respectively, to thereby interrupt transmission of rotation between the main shaft 626 and the hollow shaft 622 and collar 623. In this connection, the shaft 619 may be mounted for movement away from shaft 626. Mounting support 638 may have elongated bearing openings (not shown) through which the shaft 619 extends and which allow movement of the shaft 619 away from the main shaft 626. A suitable control member 636 may be connected to the shaft 619 and extend through the outer wall of the housing 620 to provide a handle for the operator to manually move the shaft 619 and thus the gears 618 and 625 into and out of engagement with the gears 617 and 621 respectively. In this way, the user may selectively enable the automatic advancing of the drill bit B6 into the work piece by either engaging or disengaging the respective gears, and thus, the relative rotation or lack thereof between the rod 639 and the threaded collar 623.

The embodiments of FIGS. 1–5 may be similarly constructed to allow selective engagement or disengagement of the advancing means. For example, the shaft 219 of FIG. 4 may be movably mounted and provided with a control handle comparable to the way shaft 619 of FIG. 6 is mounted and controlled.

Further, the threaded collar 623 of the embodiment of FIG. 6 could be made freely rotatable and provided with a manually openable control member comparable to control member 365 of FIG. 5 to selectively control the advancing rate.

Various modifications and changes may be made in the specific details of the illustrated structure without departing from the spirit and scope of the present invention as set forth in the following claims.

What is claimed is:

1. A separate attachment for a standard hand drill for using the rotation of the hand drill to both rotate and advance a drill bit relative to a work piece, the attachment comprising:
   a) base means;
   b) holding means movably mounted on said base means for releasibly grasping a drill bit with the axis of the drill bit generally perpendicular to the surface of the work piece and for movement relative to said base means toward and away from the work piece;
   c) transmission means on said base means for being releasibly grasped by the chuck of the hand drill to impart rotation to the transmission means, said transmission means being connected to said holding means to both (i) impart rotation to the drill bit and (ii) impart generally linear movement to said holding means relative to said base means which moves the drill bit toward and away from the work piece.

2. The attachment of claim 1 further including attachment means for releasibly attaching the base means to the work piece prior to commencing drilling.

3. The attachment of claim 1 wherein said holding means comprises a movable carriage and said base means includes at least one elongated guide rod which supports said carriage for movement along said rod, said rod extending generally parallel to the axis of the drill bit, said movable carriage being mounted on said guide rod for movement there along toward and away from the work piece.

4. The attachment of claim 3 wherein there at least two of said guide rods.

5. The attachment of claim 1 wherein said transmission means includes a rotatable input shaft gripable by the chuck of the drill, said input shaft extending generally perpendicular to the axis of the drill bit.

6. The attachment of claim 5 wherein said transmission means further includes gear means which turn the rotation of the input shaft at generally right angles.

7. The attachment of claim 3 wherein said guide rod is provided with a helical thread therealong, said movable carriage including an annular member having an internally threaded hole, said annular member being mounted on said threaded guide rod in meshing engagement with the helical thread of said guide rod and with the axis of said annular member and said guide rod being generally co-axial, relative rotation between said annular member and said guide rod producing relative linear movement between said annular member and said guide rod to thereby move the carriage and the drill bit toward and away from the work piece.

8. The attachment of claim 1 wherein said transmission means includes manually operable advancement control means for selectively enabling and disabling said generally linear movement of said holding means relative to said base means which moves the drill bit toward and away from the work piece.

9. The attachment of claim 1 wherein said transmission means includes gear reduction means to substantially reduce the rate of rotation and increase the torque from that of the drill.

10. The attachment of claim 1 further including manually operable rate control means to selectively control the rate of advancing of the holding means.

11. The attachment of claim 7 wherein said annular threaded member is normally free to rotate along with the threaded guide rod, said attachment further including a manually operable control means which is selectively movable to control the rate of advancement of the holding means, said control means being manually selectively operable to exert a desired amount of pressure on the annular member to selectively limit the free rotation of the annular member and produce relative rotation between the annular member and the threaded guide rod and thereby cause relative linear movement between the annular member and the guide rod whereby the rate of advancement of the drill bit may be selectively controlled.

12. The drill of claim 11 wherein said transmission means includes manually operable advancement control means for selectively enabling and disabling said movement of the holding means and the drill bit relative to the base means which moves the drill bit toward and away from the work piece.

13. The drill of claim 11 further including manually operable rate control means to selectively control the rate of advancing of the holding means.

* * * * *